US00RE45592E

(19) United States
(12) Reissued Patent
Park

(10) Patent Number: US RE45,592 E
(45) Date of Reissued Patent: Jun. 30, 2015

(54) PHOTOGRAPHING LENS

(71) Applicant: SAMSUNG ELECTRONICS CO., LTD., Suwon-si, Gyeonggi-do (KR)

(72) Inventor: Young-Woo Park, Suwon-si (KR)

(73) Assignee: Samsung Electronics Co., Ltd., Suwon-si (KR)

(21) Appl. No.: 14/487,817

(22) Filed: Sep. 16, 2014

Related U.S. Patent Documents

Reissue of:
(64) Patent No.: 6,917,479
Issued: Jul. 12, 2005
Appl. No.: 10/744,770
Filed: Dec. 23, 2003

(30) Foreign Application Priority Data

Dec. 30, 2002 (KR) ..... 10-2002-0087437

(51) Int. Cl.
*G02B 13/22* (2006.01)
*G02B 13/18* (2006.01)
(Continued)

(52) U.S. Cl.
CPC ..... *G02B 9/34* (2013.01); *G02B 15/173* (2013.01); *G02B 13/16* (2013.01); *G02B 13/004* (2013.01); *G02B 13/18* (2013.01); *G02B 13/22* (2013.01); *G02B 27/286* (2013.01)

(58) Field of Classification Search
CPC ..... G02B 9/34; G02B 13/18; G02B 13/22; G02B 13/004; G02B 15/173; G02B 27/286; G02B 13/16
USPC ..... 359/773
See application file for complete search history.

(56) References Cited

U.S. PATENT DOCUMENTS 4,413,888 A * 11/1983 Sato ..... 359/715
4,659,190 A * 4/1987 Mihara ..... 359/715
(Continued)

FOREIGN PATENT DOCUMENTS

JP 09-297264 A 11/1997
JP 09-297264 A 11/1998
(Continued)

OTHER PUBLICATIONS

Smith, Warren J. Modern Optical Engineering: The Design of Optical Systems, Fourth Edition. McGraw-Hill, 2008. Chapter 3.*

*Primary Examiner* — Christina Y Leung
(74) *Attorney, Agent, or Firm* — Drinker Biddle & Reath LLP

(57) ABSTRACT

The present invention is directed to a photographing lens containing, in order from an object side: a first lens having a positive refractive power and a convex surface facing the object side; a second lens having a negative refractive power; a third lens having a positive refractive power; and a fourth lens having a negative refractive power and at least one aspheric surface, the photographing lens satisfying the following conditional expressions:

$$\frac{L_T}{f} \leq 1.2$$

$$0.5 \leq \frac{f_3}{f} \leq 1.0$$

where $L_T$ denotes the distance on the optical axis between the object side of the first lens and the image side of the fourth lens; f denotes the total focal length of the photographing lens; and $f_3$ denotes the focal length of the third lens.

13 Claims, 8 Drawing Sheets

(51) Int. Cl.

| | |
|---|---|
| ***G02B 9/34*** | (2006.01) |
| ***G02B 15/173*** | (2006.01) |
| ***G02B 13/16*** | (2006.01) |
| ***G02B 13/00*** | (2006.01) |
| ***G02B 27/28*** | (2006.01) |

(56) References Cited

U.S. PATENT DOCUMENTS 4,688,903 A * 8/1987 Fujita et al. ..... 359/715
5,862,000 A * 1/1999 Takahashi et al. ..... 359/773
6,476,982 B1 11/2002 Kawakami

FOREIGN PATENT DOCUMENTS

| | | | |
|---|---|---|---|
| JP | 10-293246 | A | 11/1998 |
| JP | 2001-056434 | A | 2/2001 |
| JP | 2001-100091 | A | 4/2001 |
| JP | 2002-090620 | A | 3/2002 |
| JP | 2002-162561 | A | 6/2002 |
| JP | 2002-228922 | A | 8/2002 |

* cited by examiner

PHOTOGRAPHING LENS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

*This application is a reissue application of U.S. patent application Ser. No. 10/744,770, filed Dec. 23, 2003, which issued as U.S. Pat. No. 6,917,479 on Jul. 12, 2005, the contents of which are incorporated herein by reference.*

This application claims priority to and the benefit of Korea Patent Application No. 2002-87437 filed on Dec. 30, 2002 in the Korean Intellectual Property Office, the content of which is incorporated herein by reference.

FIELD OF THE INVENTION

The present invention relates to a photographing lens. More specifically, the present invention relates to a miniature photographing lens for cameras using an image pickup device such as charge coupled device (CCD).

BACKGROUND OF THE INVENTION

Recently, the use of electronic still cameras and video cameras employing a CCD or a solid-state image pickup device has been expanding rapidly, and the needs for miniaturization and weight/cost savings are increasing. Miniaturization and weight/cost savings are also needed for photographing lenses that are built into cameras.

The optical system using a solid-state image pickup device employs a crystal filter so as to prevent moiré caused by the periodical structure of the image pickup device. Therefore, the thickness and location of the crystal filter must be taken into consideration in designing optical systems. In particular, the telecentricity of an incident ray to the image side to face an image forming plane is an important factor of the design.

Thus the photographing lens for cameras using a solid-state image pickup device must have good telecentricity and a long retrofocal length for the use of the crystal filter, as well as high resolution.

The photographing lens is also required to have a low F-number for entrance of a larger amount of light so as to compensate for the deterioration of sensitivity caused by the high pixel value of the solid-state image pickup device, and its compactness is needed to realize miniaturization and weight savings.

To satisfy these requirements, lens-designing technologies for adequately arranging the refractive powers of the component lenses of the photographing lens and precise technologies for realizing good performance are necessary.

The conventional optical systems using a solid-state image pickup device are as follows:

1) Japanese Patent Application Laid-Open No. Pyung 9-297264; and

2) Japanese Patent Application Laid-Open No. Pyung 10-293246.

The optical systems disclosed in the cited patents 1) and 2) are retrofocus optical systems comprising, in order from the object side, a lens group having a negative refractive power, an iris diaphragm, and a second lens group having a positive refractive power. These conventional optical systems may easily secure a large amount of peripheral light and have good telecentricity, but the correction of aberration, particularly distortion, is difficult to achieve, and the overall length of the optical systems is increased.

SUMMARY OF THE INVENTION

The present invention provides a compact photographing lens that has a high resolution with good telecentricity and a long retrofocal length as a photographing optical system of a camera using an image pickup device.

One embodiment of the present invention is directed to a photographing lens comprising, in order from an object side: a first lens having a positive refractive power and a convex surface on the object side; a second lens having a negative refractive power; a third lens having a positive refractive power; and a fourth lens having a negative refractive power and at least one aspheric surface, the photographing lens satisfying the following conditional expressions:

$$\frac{L_T}{f} \leq 1.2$$

$$0.5 \leq \frac{f_3}{f} \leq 1.0$$

where $L_T$ denotes the distance on the optical axis between the object side of the first lens and the image side of the fourth lens; f denotes the total focal length of the photographing lens; and $f_3$ denotes the focal length of the third lens. The third lens has at least one aspheric surface.

The photographing lens further satisfies the following conditional expressions:

$$0.5 \leq \frac{f_1}{f} \leq 2.0$$

$$-1.2 \leq \frac{f_2}{f} \leq -0.4$$

where $f_1$ denotes the focal length of the first lens; and $f_2$ denotes the focal length of the second lens.

In addition, the photographing lens further satisfies the following conditional expressions:

$$|n_3 - n_4| \geq 0.1$$

where $n_3$ denotes the refractive index of the third lens; and $n_4$ denotes the refractive index of the fourth lens.

Additionally, the photographing lens further satisfies the following conditional expressions:

$$-20 \leq \frac{f_4}{f} \leq -1$$

where $f_4$ denotes the focal length of the fourth lens.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE INVENTION

Figure 1:
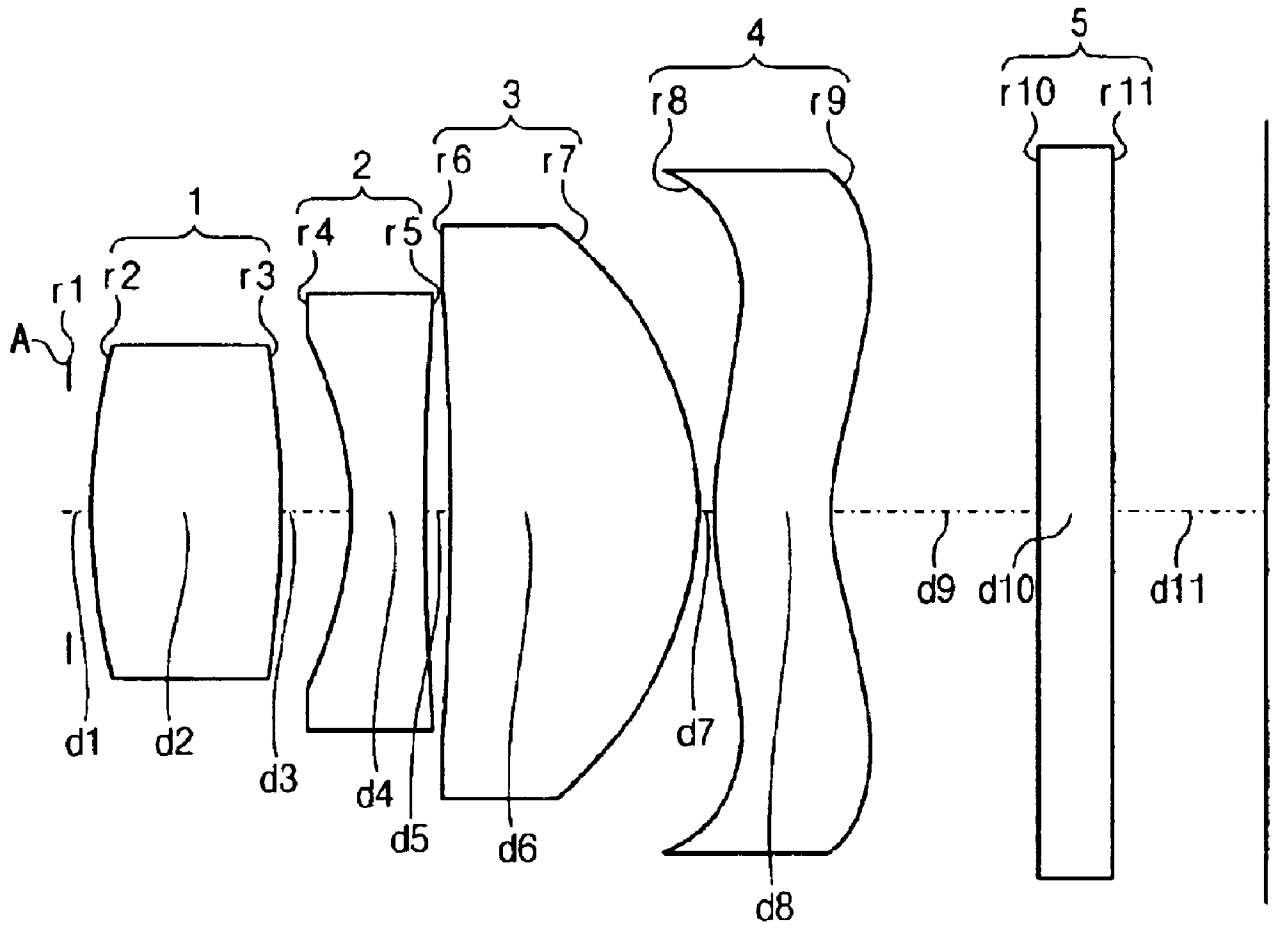
FIG. 1 illustrates the configuration of a photographing lens according to a first embodiment of the present invention.

In the following detailed description, only a preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Embodiments of the present invention provide a photographing lens having high resolution and good telecentricity, and can be miniaturized as a photographing optical system of cameras using an image pickup device.

FIGS. 1, 3, 5, and 7 illustrate the configuration of the photographing lens according to an embodiment of the present invention.

As shown in FIGS. 1, 3, 5, and 7, the photographing lens according to an embodiment of the present invention includes, in order from an object side, a first lens 1 having a positive refractive power, a second lens 2 having a negative refractive power, a third lens 3 having a positive refractive power, and a fourth lens 4 having a negative refractive power.

Additionally, the photographing lens has an iris diaphragm A located on the object side of the first lens 1, and a filter 5 on the image side of the fourth lens 4.

The following description describes the configuration of each lens of the four embodiments of the present invention depicted in FIGS. 1-8.

The photographing lens according to an embodiment of the present invention basically has a second lens 2 having a negative refractive power after a first lens 1 having a positive refractive power, a third lens 3 having a positive refractive power after the second lens 2, and a fourth lens 4 having a negative refractive power after the third lens 3, so as to correct spherical aberration, coma, or chromatic aberration occurring near the optical axis by the first and second lenses 1 and 2 and to maintain telecentricity on the third lens 3. The arrangement of the fourth lens 4 contributes to the correction of abaxial aberrations such as astigmatism and distortion.

The photographing lens according to an embodiment of the present invention satisfies the following conditional expression:

$$\frac{L_T}{f} \leq 1.2 \qquad \text{[Conditional Expression 1]}$$

where $L_T$ denotes the distance between the object side of the first lens 1 and the image side of the fourth lens 4; and f denotes the total focal length of the photographing lens.

The conditional expression 1 defines the ratio of the length of the photographing lens to the total focal length so as to realize the compactness of the photographing lens. When the ratio exceeds the upper limit of the conditional expression 1, the telecentricity may be better but the increased length makes it difficult to realize compactness of the photographing lens.

The photographing lens according to an embodiment of the present invention also satisfies the following conditional expression:

[Conditional Expression 2]

$$|n_3 - n_4| \geq 0.1$$

where $n_3$ denotes the refractive index of the third lens 3; and $n_4$ denotes the refractive index of the fourth lens 4.

The conditional expression 2 defines the difference of refractive index between the third and fourth lenses 3 and 4. When the ratio falls below the lower limit of the conditional expression 2, the magnification chromatic aberration becomes large due to the increased difference of refractive index between the third and fourth lenses 3 and 4.

The photographing lens according to an embodiment of the present invention also satisfies the following conditional expression:

$$0.5 \leq \frac{f_1}{f} \leq 2.0 \qquad \text{[Conditional Expression 3]}$$

where $f_1$ denotes the focal length of the first lens 1. The conditional expression 3 defines the ratio of the focal length of the first lens 1 to the total focal length of the photographing lens. When the ratio exceeds the upper limit of the conditional expression 3, the refractive power of the first lens 1 lowers to increase the chromatic aberration. On the other hand, when the ratio falls below the lower limit of the conditional expression 3, the refractive power of the first lens 1 becomes large and increases the spherical aberration and coma.

The photographing lens according to the embodiment of the present invention also satisfies the following conditional expression:

$$-1.2 \leq \frac{f_2}{f} \leq -0.4 \qquad \text{[Conditional Expression 4]}$$

where $f_2$ denotes the focal length of the second lens 2. The conditional expression 4 defines the ratio of the focal length of the second lens 2 to the total focal length of the photographing lens. When the ratio exceeds the upper limit of the conditional expression 4, the refractive power of the second lens 2 increases and it becomes difficult to correct the spherical aberration. On the other hand, when the ratio falls below the lower limit of the conditional expression 4, the refractive power of the second lens 2 becomes lower and it becomes difficult to correct the chromatic aberration.

The photographing lens according to the embodiment of the present invention also satisfies the following conditional expression:

$$0.5 \le \frac{f_3}{f} \le 1.0$$ [Conditional Expression 5]

where $f_3$ denotes the focal length of the third lens 3. The conditional expression 5 defines the ratio of the focal length of the third lens 3 to the total focal length of the photographing lens. When the ratio exceeds the upper limit of the conditional expression 5, the refractive power of the third lens 3 lowers and it becomes difficult to maintain telecentricity. On the other hand, when the ratio falls below the lower limit of the conditional expression 5, the refractive power of the third lens 3 becomes stronger and increases the chromatic aberration and it becomes difficult to correct the astigmatism.

The photographing lens according to the embodiment of the present invention also satisfies the following conditional expression:

$$-20 \le \frac{f_4}{f} \le -1$$ [Conditional Expression 6]

where $f_4$ denotes the focal length of the fourth lens 4. The conditional expression 6 defines the ratio of the focal length of the fourth lens 4 to the total focal length of the photographing lens. When the ratio exceeds the upper limit of the conditional expression 6, the refractive power of the fourth lens 4 becomes stronger deteriorating the telecentricity, and it becomes difficult to correct distortion. On the other hand, when the ratio falls below the lower limit of the conditional expression 6, the refractive power of the fourth lens 4 reduces to increase the total focal length of the photographing lens, and it becomes difficult to realize the compactness of the photographing lens.

The first to fourth embodiments of the present invention depicted in FIGS. 1-8 that satisfy the aforementioned conditions (conditional expressions 1 to 6) will be described.

In the description, "f" is the focal length, "ri (where i=1 to 11)" is the radius of curvature of a lens surface, "di (where i=1 to 11)" is the thickness of a lens or the distance between lenses, "nd" is the refractive index, and "v" is the Abbe's value. Here, the unit of length is "mm (millimeter)".

For the photographing lens according to the first embodiment of the present invention, the F-number Fno is 2.82, the focal length f is 4.5 mm, and the angle of view (2ω) is 60.60°.

FIG. 1 illustrates the configuration of the photographing lens according to a first embodiment of the present invention. The photographing lens according to the first embodiment comprises, as shown in FIG. 1, a first lens 1 having a positive refractive power and a convex surface facing to the object side, a second lens 2 having a negative refractive power and a concave surface on both sides, a third lens 3 having a positive refractive power and a convex surface on the image side, and a fourth lens 4 having a negative refractive power and at least one aspheric surface. In addition, the photographing lens has filter 5 arranged on the image side of the fourth lens 4.

Various values associated with the component lenses of the photographing lens according to the first embodiment of the present invention are listed in Table 1.

TABLE 1

| Surface Number | Radius of Curvature (r) | Thickness, Distance (d) | Refractive Index (nd) | Variation (v) |
|---|---|---|---|---|
| 1 | ∞ | 0.150000 | | |
| 2 | 4.50400 | 1.260000 | 1.806 | 46.5 |
| 3 | −8.72100 | 0.470000 | | |
| 4 | −2.50000 | 0.500000 | 1.847 | 23.8 |
| 5 | 16.54200 | 0.170000 | | |
| *6 | −13.96700 | 1.690000 | 1.743 | 49.3 |
| *7 | −2.09300 | 0.100000 | | |
| *8 | 2.57200 | 0.800000 | 1.525 | 56.4 |
| *9 | 1.94700 | 1.390000 | | |
| 10 | ∞ | 0.500000 | 1.517 | 64.2 |
| 11 | ∞ | 1.000000 | | |

The symbol "*" indicates the aspheric surface. Aspheric surface coefficients can be expressed by the following equation:

$$x = \frac{c^2y^2}{1+\sqrt{1-(K+1)c^2y^2}} + Ay^4 + By^6 + Cy^8 + Dy^{10}$$ [Equation 1]

where x is the distance along the optical axis from the vertex of the lens; y is the distance in the direction vertical to the optical axis; c is the inverse (1/R) of the radius of curvature on the vertex of the lens; K is the conical constant; and A, B, C, and D are aspheric surface coefficients.

The aspheric surface coefficients according to the first embodiment of the present invention as determined by the equation 1 are presented in Table 2. In the first embodiment, the third and fourth lenses 3 and 4 have a double aspheric surface.

TABLE 2

| Aspheric Surface Coefficients of Sixth Face | |
|---|---|
| K | 0.000000 |
| A | 0.160073E−01 |
| B | −0.822184E−02 |
| C | 0.125395E−02 |
| D | 0.000000E+00 |
| **Aspheric Surface Coefficients of Seventh Face** | |
| K | −5.182678 |
| A | −0.551418E−01 |
| B | 0.150488E−01 |
| C | −0.328615E−02 |
| D | 0.255345E−03 |
| **Aspheric Surface Coefficients of Eighth Face** | |
| K | 0.000000 |
| A | −0.491192E−01 |
| B | −0.755780E−02 |
| C | 0.238448E−02 |
| D | −0.305757E−03 |
| **Aspheric Surface Coefficients of Ninth Face** | |
| K | −1.853830 |
| A | −0.578054E−01 |
| B | 0.250117E−02 |
| C | 0.520886E−03 |
| D | −0.742182E−04 |

Figure 2:
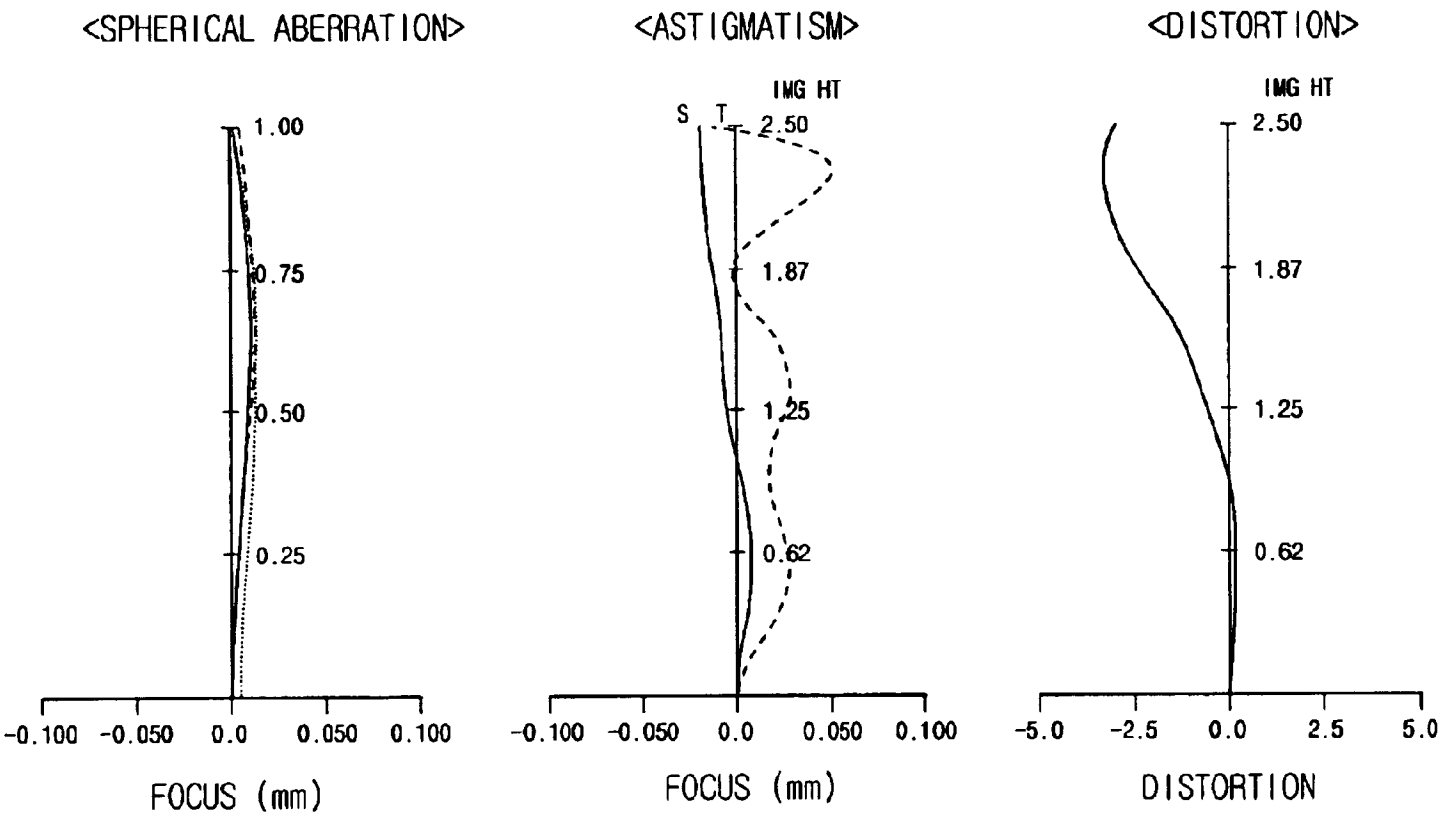
FIG. 2 is a graph showing aberrations of the photographing lens according to the first embodiment of the present invention depicted in FIG. 1.

FIG. 2 shows the aberrations of the photographing lens according to the first embodiment of the present invention.

For the photographing lens according to the second embodiment of the present invention, the F-number Fno is 2.82, the focal length f is 4.5 mm, and the angle of view (2ω) is 59.46°.

Figure 3:
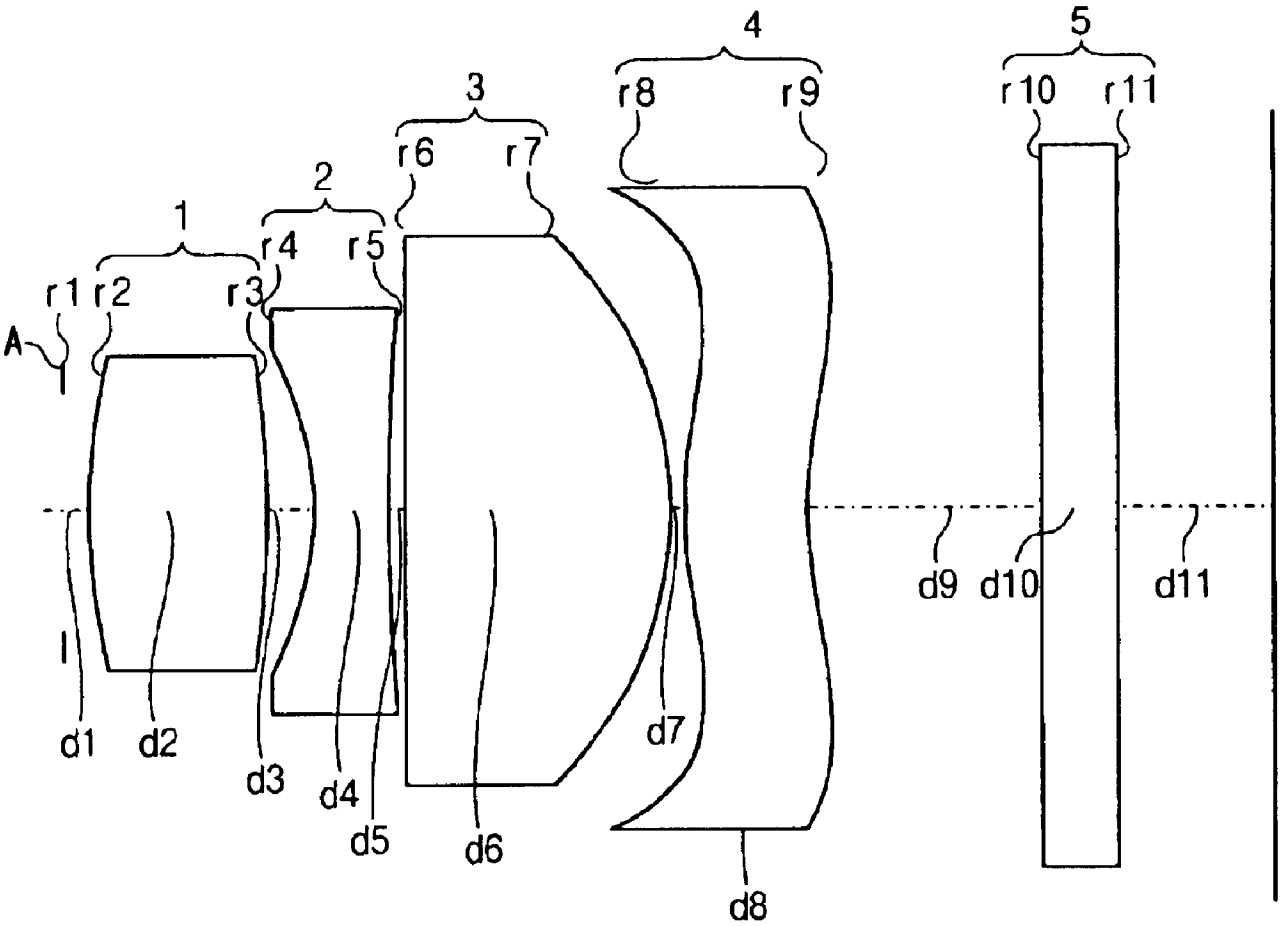
FIG. 3 illustrates the configuration of a photographing lens according to a second embodiment of the present invention.

FIG. 3 illustrates the configuration of the photographing lens according to the second embodiment of the present invention. The configuration of the photographing lens according to the second embodiment is the same as that of the first embodiment, as shown in FIG. 3.

Various values associated with the component lenses of the photographing lens according to the second embodiment of the present invention are listed in Table 3.

TABLE 3

| Surface Number | Radius of Curvature (r) | Thickness, Distance (d) | Refractive Index (nd) | Variation (v) |
|---|---|---|---|---|
| 1 | ∞ | 0.150000 | | |
| *2 | 3.67900 | 1.170000 | 1.806 | 40.7 |
| *3 | −9.04300 | 0.300000 | | |
| 4 | −2.21800 | 0.500000 | 1.847 | 23.8 |
| 5 | 12.90500 | 0.130000 | | |
| 6 | −92.09900 | 1.740000 | 1.804 | 46.5 |
| 7 | −2.47900 | 0.100000 | | |
| *8 | 3.82500 | 0.800000 | 1.607 | 27.6 |
| *9 | 3.23800 | 1.540000 | | |
| 10 | ∞ | 0.500000 | 1.5168 | 64.2 |
| 11 | ∞ | 1.000000 | | |

The symbol "*" indicates the aspheric surface. In the second embodiment, the first and fourth lenses 1 and 4 have a double aspheric surface. The aspheric surface coefficients according to the second embodiment of the present invention are presented in Table 4.

TABLE 4

| | |
|---|---|
| Aspheric Surface Coefficients of Second Face | |
| K | 3.117975 |
| A | −0.572230E−02 |
| B | −0.217344E−02 |
| C | 0.688181E−02 |
| D | −0.396604E−02 |
| Aspheric Surface Coefficients of Third Face | |
| K | 12.412284 |
| A | −0.693221E−02 |
| B | 0.800818E−02 |
| C | −0.372426E−04 |
| D | 0.338160E−05 |
| Aspheric Surface Coefficients of Eighth Face | |
| K | −0.770745 |
| A | −0.340273E−01 |
| B | −0.137097E−02 |
| C | −0.577892E−03 |
| D | −0.841877E−04 |
| Aspheric Surface Coefficients of Ninth face | |
| K | −0.433161 |
| A | −0.353828E−01 |
| B | −0.985183E−03 |
| C | 0.303790E−04 |
| D | 0.102236E−04 |

Figure 4:
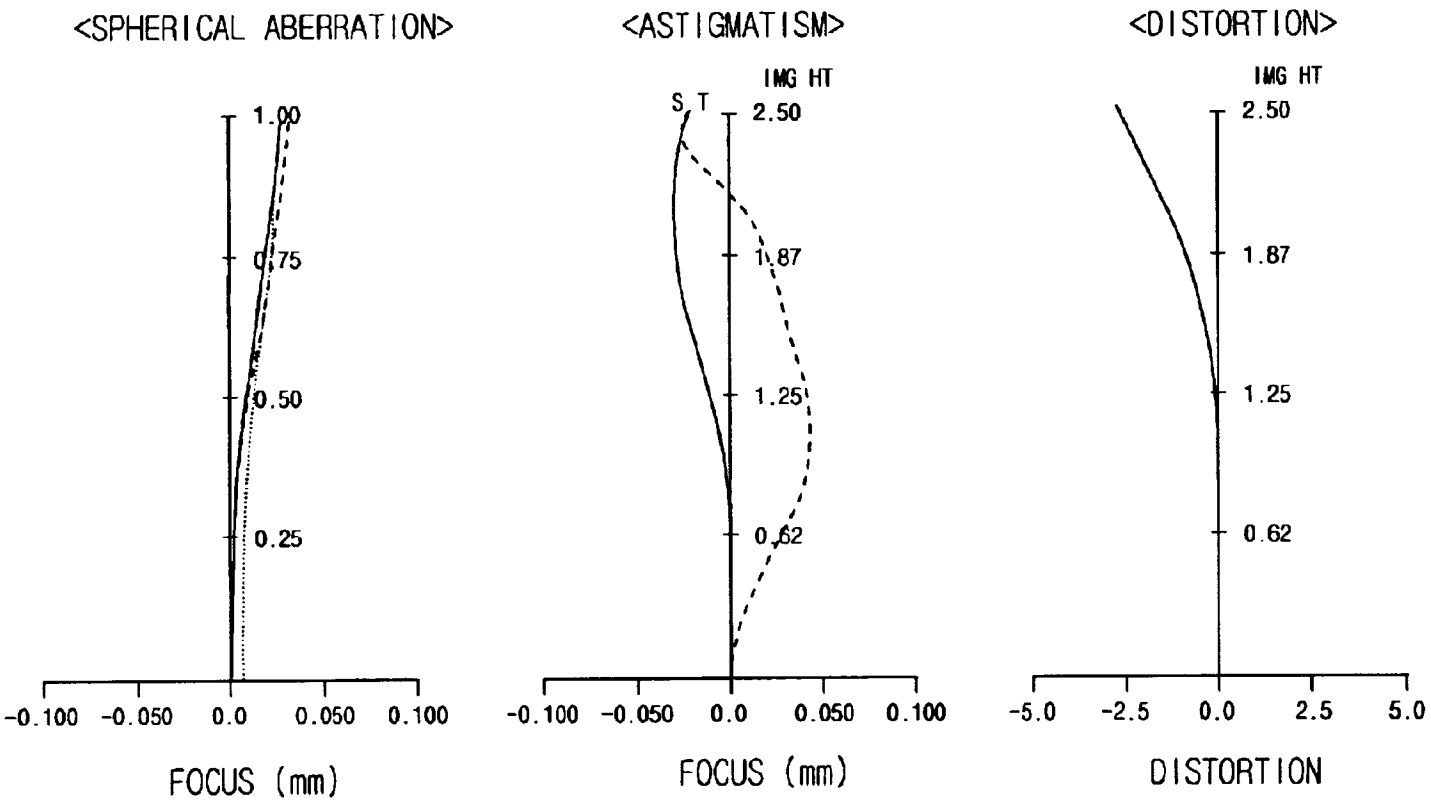
FIG. 4 is a graph showing the aberrations of the photographing lens according to the second embodiment of the present invention depicted in FIG. 3.

FIG. 4 shows the aberrations of the photographing lens according to the second embodiment of the present invention.

For the photographing lens according to the third embodiment of the present invention, the F-number Fno is 2.80, the focal length f is 5.6 mm, and the angle of view (2ω) is 62.43°.

Figure 5:
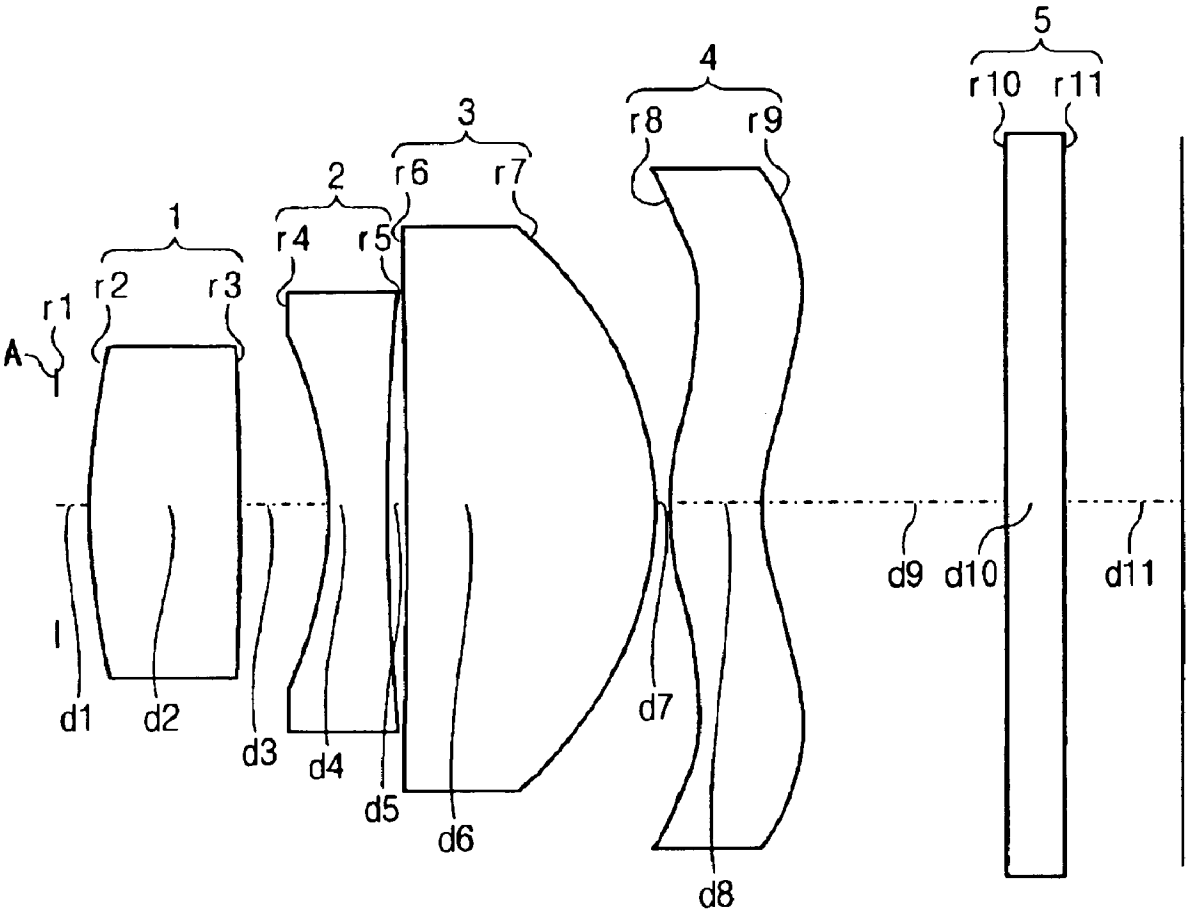
FIG. 5 illustrates the configuration of a photographing lens according to a third embodiment of the present invention.

FIG. 5 illustrates the configuration of the photographing lens according to the third embodiment of the present invention. The configuration of the photographing lens according to the third embodiment is the same as that of the first embodiment, as shown in FIG. 5.

Various values associated with the component lenses of the photographing lens according to the third embodiment of the present invention are listed in Table 5.

TABLE 5

| Surface Number | Radius of Curvature (r) | Thickness, Distance (d) | Refractive Index (nd) | Variation (v) |
|---|---|---|---|---|
| 1 | ∞ | 0.280000 | | |
| 2 | 5.35700 | 1.290000 | 1.835 | 43.0 |
| 3 | −26.73400 | 0.790000 | | |
| 4 | −3.50000 | 0.500000 | 1.847 | 23.8 |
| 5 | 15.89600 | 0.180000 | | |
| *6 | −40.81200 | 2.190000 | 1.743 | 49.3 |
| *7 | −2.72000 | 0.100000 | | |
| *8 | 2.60100 | 0.800000 | 1.607 | 27.6 |
| *9 | 2.08600 | 2.131000 | | |
| 10 | ∞ | 0.500000 | 1.5168 | 64.2 |
| 11 | ∞ | 1.000000 | | |

The symbol "*" indicates the aspheric surface. In the third embodiment, the third and fourth lenses 3 and 4 have a double aspheric surface as in the first embodiment. The aspheric surface coefficients are presented in Table 6.

TABLE 6

| | |
|---|---|
| Aspheric Surface Coefficients of Sixth Face | |
| K | 0.000000 |
| A | 0.574890E−02 |
| B | −0.35331.9E−02 |
| C | 0.793086E−03 |
| D | −0.513107E−04 |
| Aspheric Surface Coefficients of Seventh Face | |
| K | −1.532735 |
| A | −0.149553E−01 |
| B | 0.370413E−02 |
| C | −0.753572E−03 |
| D | 0.598484E−04 |
| Aspheric Surface Coefficients of Eighth Face | |
| K | −5.745605 |
| A | −0.105599E−01 |
| B | −0.319804E−02 |
| C | 0.420310E−03 |
| D | −0.110990E−04 |
| Aspheric Surface Coefficients of Ninth face | |
| K | −1.547321 |
| A | −0.407695E−01 |
| B | 0.280992E−02 |
| C | −0.127053E−03 |
| D | 0.463035E−05 |

Figure 6:
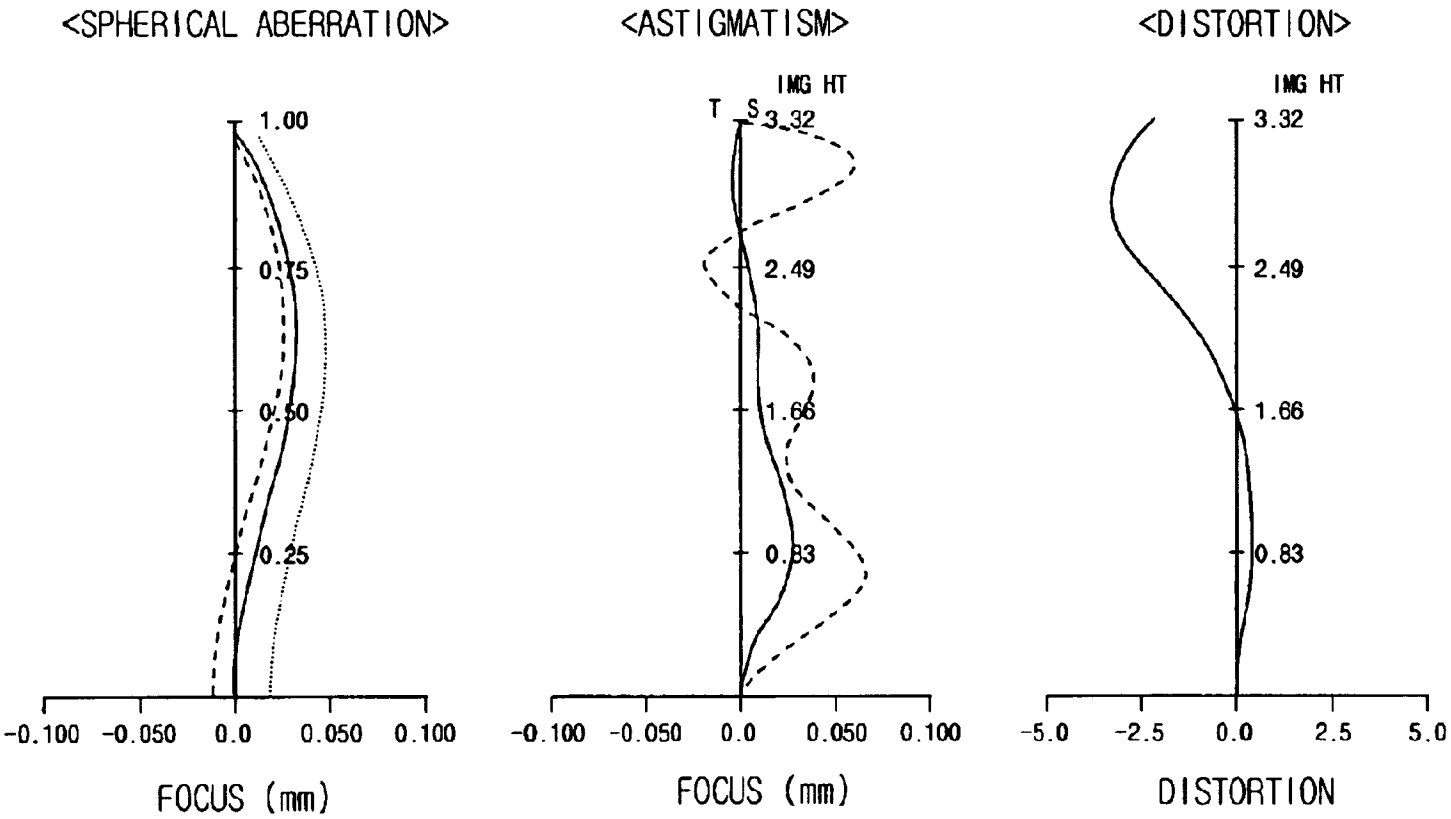
FIG. 6 is a graph showing the aberrations of the photographing lens according to the third embodiment of the present invention depicted in FIG. 5.

FIG. 6 shows the aberrations of the photographing lens according to the third embodiment of the present invention.

For the photographing lens according to the fourth embodiment of the present invention, the F-number Fno is 3.18, the focal length f is 7.0 mm, and the angle of view (2ω) is 66.30°.

Figure 7:
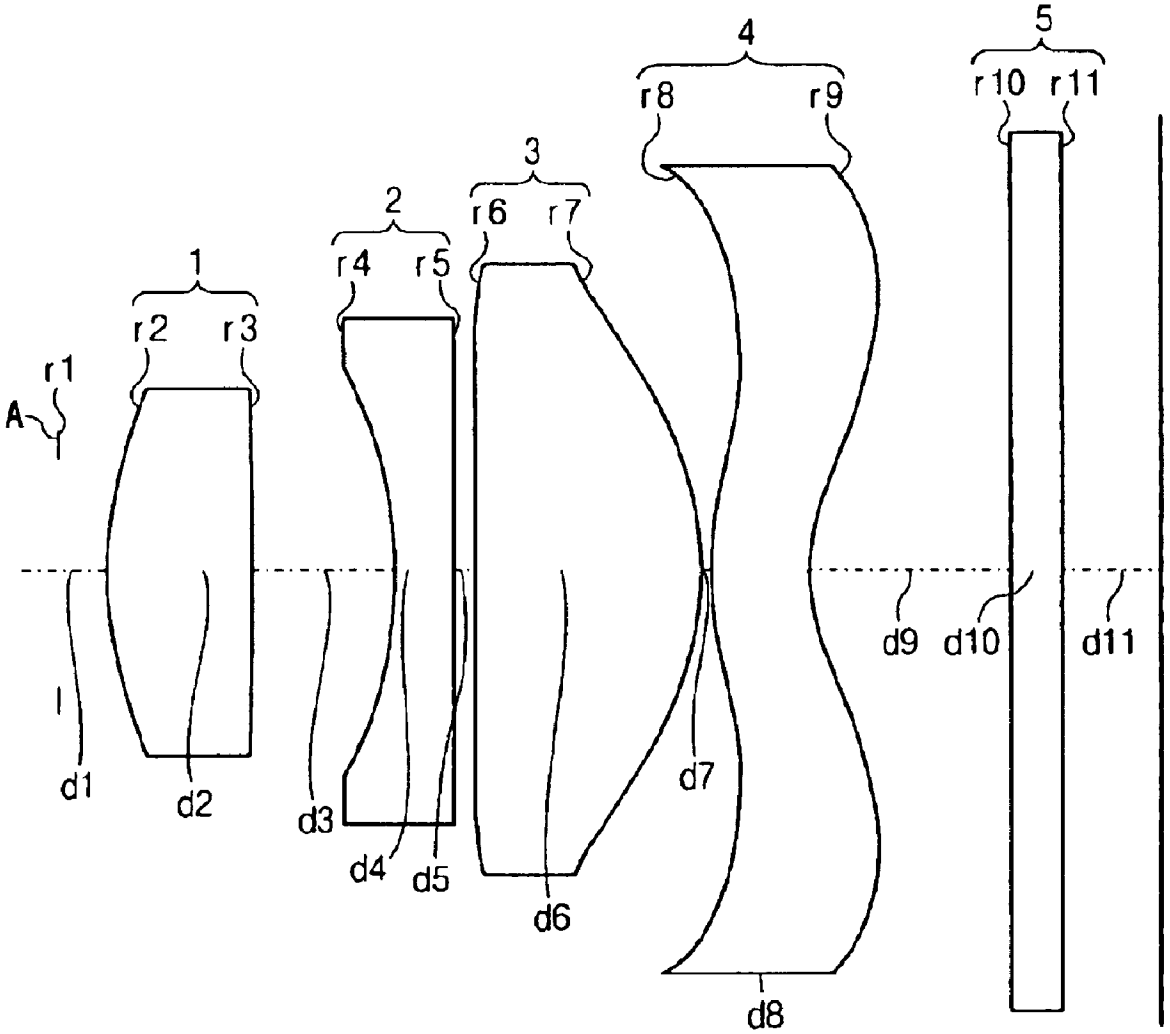
FIG. 7 illustrates the configuration of a photographing lens according to a fourth embodiment of the present invention.

FIG. 7 illustrates the configuration of the photographing lens according to the fourth embodiment of the present invention. The configuration of the photographing lens according to the fourth embodiment is the same as that of the first embodiment, as shown in FIG. 7.

Various values associated with the component lenses of the photographing lens according to the fourth embodiment of the present invention are listed in Table 7.

TABLE 7

| Surface Number | Radius of Curvature (r) | Thickness, Distance (d) | Refractive Index (nd) | Variation (v) |
|---|---|---|---|---|
| 1 | ∞ | 0.500000 | | |
| 2 | 4.08100 | 1.480000 | 1.517 | 64.2 |
| 3 | −129.34100 | 1.460000 | | |
| 4 | −4.39100 | 0.600000 | 1.847 | 23.8 |
| 5 | 106.03700 | 0.220000 | | |
| *6 | 103.53700 | 2.340000 | 1.806 | 40.7 |
| *7 | −2.86400 | 0.100000 | | |
| *8 | 3.52800 | 1.100000 | 1.607 | 27.6 |
| *9 | 1.76500 | 2.030000 | | |
| 10 | ∞ | 0.500000 | 1.5168 | 64.2 |
| 11 | ∞ | 1.000000 | | |

The symbol "*" indicates the aspheric surface. In the third embodiment, the third and fourth lenses 3 and 4 have a double aspheric surface as in the first embodiment. The aspheric surface coefficients are presented in Table 8.

TABLE 8

| | |
|---|---|
| Aspheric Surface Coefficients of Sixth Face | |
| K | 0.000000 |
| A | 0.251650E−02 |
| B | −0.109474E−02 |
| C | 0.133684E−03 |
| D | −0.406126E−05 |
| Aspheric Surface Coefficients of Seventh Face | |
| K | −3.679245 |
| A | −0.549879E−02 |
| B | 0.589170E−03 |
| C | −0.101550E−03 |
| D | 0.798107E−05 |
| Aspheric Surface Coefficients of Eighth Face | |
| K | −10.364695 |
| A | −0.479419E−02 |
| B | −0.639085E−03 |
| C | 0.809810E−04 |
| D | −0.274455E−05 |
| Aspheric Surface Coefficients of Ninth face | |
| K | −3.685431 |
| A | −0.107672E−01 |
| B | 0.581683E−03 |
| C | −0.246036E−04 |
| D | 0.367072E−06 |

Figure 8:
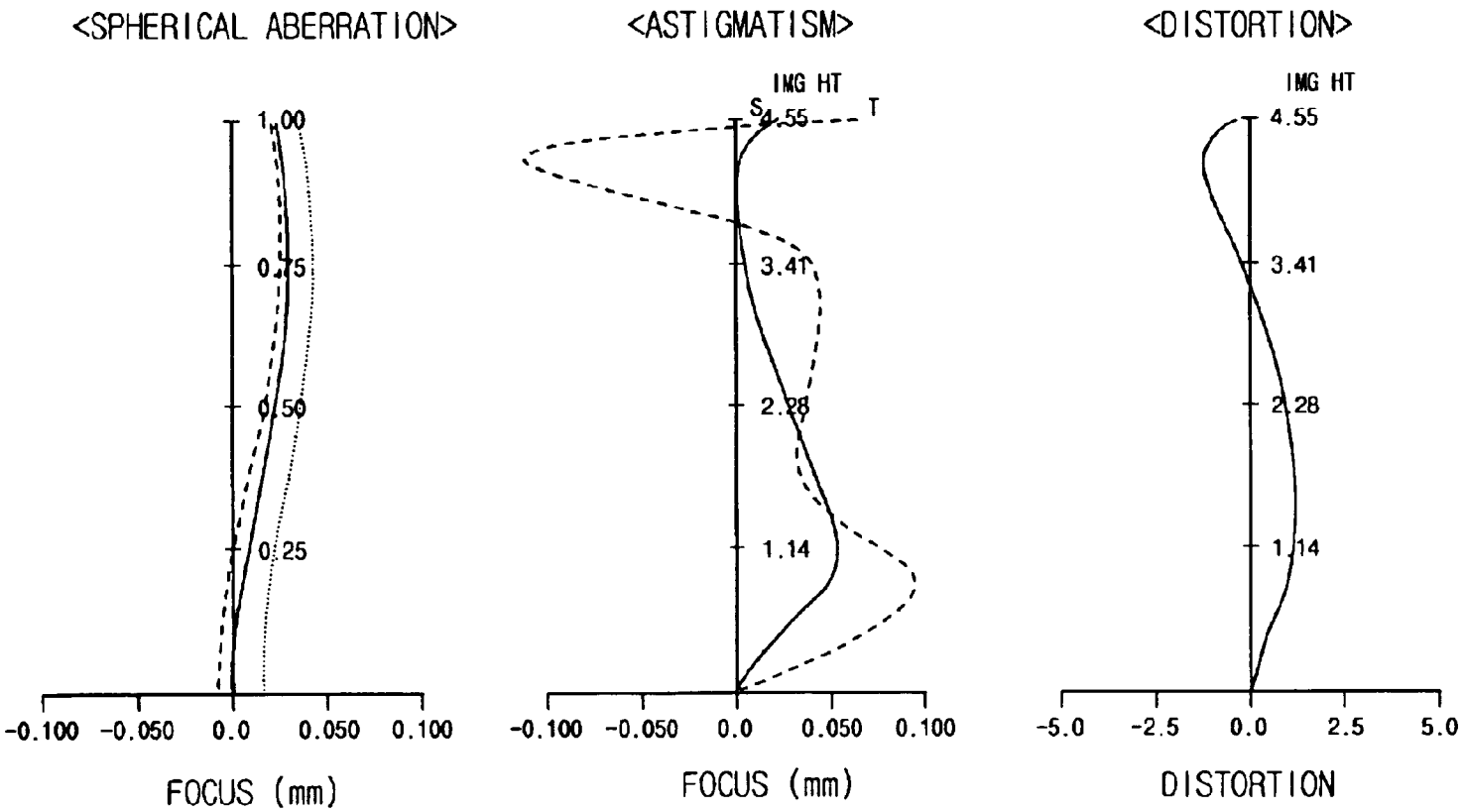
FIG. 8 is a graph showing the aberrations of the photographing lens according to the fourth embodiment of the present invention depicted in FIG. 7.

FIG. 8 shows the aberrations of the photographing lens according to the fourth embodiment of the present invention.

The photographing lenses according to the aforementioned embodiments of the present invention satisfy the above-stated conditions (Conditionals Expressions 1 to 6), and the various values for the respective conditional expressions are presented in Table 9.

TABLE 9

| | Embodiment | | | |
|---|---|---|---|---|
| | 1 | 2 | 3 | 4 |
| Conditional Expression 1 | 1.11 | 1.05 | 1.05 | 1.03 |
| Conditional Expression 2 | 0.22 | 0.20 | 0.14 | 0.20 |

TABLE 9-continued

| | Embodiment | | | |
|---|---|---|---|---|
| | 1 | 2 | 3 | 4 |
| Conditional Expression 3 | 0.85 | 0.75 | 1.20 | 1.70 |
| Conditional Expression 4 | −0.56 | −0.48 | −0.74 | −1.09 |
| Conditional Expression 5 | 0.69 | 0.69 | 0.85 | 0.77 |
| Conditional Expression 6 | −6.05 | −15.87 | −9.32 | −1.63 |

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the embodiments of the present invention provide a photographing lens having telecentricity adequate for solid-state image pickup devices such as a CCD, and high resolution.

The embodiments of the present invention also provide a photographing lens that has an adequate arrangement of refractive powers of the component lenses and aspheric surfaces and thereby can be miniaturized with high performance.

What is claimed is:

1. A photographing lens comprising, in order from an object side:

a first lens having a positive refractive power and a convex surface facing the object side;

a second lens, *separate from the first lens,* having a negative refractive power;

a third lens having a positive refractive power, *aspheric surfaces on both sides, and a concave surface on the object side*; and a fourth lens having a negative refractive power and [at least one] aspheric [surface] *surfaces on both sides*, the photographing lens satisfying the following conditional expressions:

$$0.75 < f_1/f < 2.0$$

$$\frac{L_T}{f} \leq 1.2$$

$$0.5 \leq \frac{f_3}{f} \leq 1.0$$

wherein $L_T$ denotes the distance on the optical axis between the object side of the first lens and the image side of the fourth lens; f denotes the total focal length of the photographing lens; $f_1$ *denotes the focal length of the first lens;* and $f_3$ denotes the focal length of the third lens.

[2. The photographing lens as claimed in claim 1, wherein the third lens has at least one aspheric surface.]

3. The photographing lens as claimed in claim 1, wherein the photographing lens further satisfies the following conditional [expressions] *expression*:

$$[0.5 \leq \frac{f_1}{f} \leq 2.0]$$

$$[-1.2 \leq \frac{f_2}{f} \leq -0.4]$$

$$-1.2 \leq f_2/f \leq -0.4$$

wherein [$f_1$ denotes the focal length of the first lens; and] $f_2$ denotes the focal length of the second lens.

4. The photographing lens as claimed in claim 1, wherein the photographing lens further satisfies the following conditional expressions:

$$|n_3-n_4|\geq 0.1$$

wherein $n_3$ denotes the refractive index of the third lens; and $n_4$ denotes the refractive index of the fourth lens.

5. The photographing lens as claimed in claim 1, wherein the photographing lens further satisfies the following conditional expressions:

$$-20 \leq \frac{f_4}{f} \leq -1$$

wherein $f_4$ denotes the focal length of the fourth lens.

*6. The photographing lens as claimed in claim 1, wherein the photographing lens satisfies the following expression:*

$$0.85<f_1/f<2.0.$$

*7. The photographing lens as claimed in claim 1, wherein the photographing lens comprises an iris diaphragm located on the object side of the first lens.*

*8. A photographing lens comprising, in order from an object side:*

*a first lens having a positive refractive power, a convex surface facing the object side, and aspheric surfaces on both sides;*

*a second lens having a negative refractive power;*

*a third lens having a positive refractive power and a concave surface on the object side; and*

*a fourth lens having a negative refractive power and aspheric surfaces on both sides, the photographing lens satisfying the following conditional expressions:*

$$0.75<f_1/f<2.0$$

$$\frac{L_T}{f} \leq 1.2$$

$$0.5 \leq \frac{f_3}{f} \leq 1.0$$

*wherein $L_T$ denotes the distance on the optical axis between the object side of the first lens and the image side of the fourth lens; f denotes the total focal length of the photographing lens; $f_1$ denotes the focal length of the first lens; and $f_3$ denotes the focal length of the third lens.*

*9. The photographing lens as claimed in claim 8, wherein the photographing lens satisfies the following conditional expression:*

$$0.85<f_1/f<2.0.$$

*10. The photographing lens as claimed in claim 8, wherein the photographing lens comprises an iris diaphragm located on the object side of the first lens.*

*11. A photographing lens comprising, in order from an object side:*

*a first lens having a positive refractive power and a convex surface facing the object side;*

*a second lens having a negative refractive power;*

*a third lens having a positive refractive power; and*

*a fourth lens having a negative refractive power and at least one aspheric surface, the photographing lens satisfying the following conditional expressions:*

$$0.85 < f_1/f < 2.0$$

$$\frac{L_T}{f} \leq 1.2$$

$$0.5 \leq \frac{f_3}{f} \leq 1.0$$

*wherein $L_T$ denotes the distance on the optical axis between the object side of the first lens and the image side of the fourth lens; f denotes the total focal length of the photographing lens; $f_1$ denotes the focal length of the first lens; and $f_3$ denotes the focal length of the third lens.*

*12. The photographing lens as claimed in claim 11, wherein the photographing lens comprises an iris diaphragm located on the object side of the first lens.*

*13. The photographing lens as claimed in claim 10, wherein the third lens has aspheric surfaces on both sides and the fourth lens has aspheric surfaces on both sides.*

*14. The photographing lens as claimed in claim 10, wherein the first lens has aspheric surfaces on both sides and the fourth lens has aspheric surfaces on both sides.*

* * * * *